(12) United States Patent
Wingfield et al.

(10) Patent No.: US 10,106,172 B2
(45) Date of Patent: Oct. 23, 2018

(54) SHARED VEHICLE SYSTEM (71) Applicant: Ford Global Technologies, LLC, Dearborn, MI (US)

(72) Inventors: Eric H. Wingfield, Ann Arbor, MI (US); Dimitar Petrov Filev, Novi, MI (US); Michael Cavaretta, Plymouth, MI (US); Kathleen Blackmore, Northville, MI (US); Clifford Anthony Bailey, Canton, MI (US); John Shutko, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 100 days.

(21) Appl. No.: 14/800,533

(22) Filed: Jul. 15, 2015

(65) Prior Publication Data

US 2016/0046300 A1 Feb. 18, 2016

Related U.S. Application Data (60) Provisional application No. 62/038,390, filed on Aug. 18, 2014, provisional application No. 62/038,392, filed on Aug. 18, 2014.

(51) Int. Cl.
| | |
|---|---|
| *B60W 50/08* | (2012.01) |
| *G06Q 30/06* | (2012.01) |
| *G01C 21/36* | (2006.01) |
| *B60W 50/10* | (2012.01) |
| *G01C 21/34* | (2006.01) |
| *B60W 50/00* | (2006.01) |

(52) U.S. Cl.
CPC .......... *B60W 50/08* (2013.01); *B60W 50/085* (2013.01); *B60W 50/10* (2013.01); *G01C 21/3438* (2013.01); *G01C 21/3685* (2013.01); *G06Q 30/0645* (2013.01); *B60W 2050/0063* (2013.01); *B60W 2540/04* (2013.01); *B60W 2540/28* (2013.01)

(58) Field of Classification Search
USPC ...................................................... 701/300
See application file for complete search history.

(56) References Cited

U.S. PATENT DOCUMENTS

| | | | |
|---|---|---|---|
| 6,775,202 B2* | 8/2004 | Mueller-Dombois | ...................... G01V 1/008 340/690 |
| 7,453,217 B2* | 11/2008 | Lys | ...................... B60Q 1/2696 315/291 |

(Continued)

FOREIGN PATENT DOCUMENTS

| | | |
|---|---|---|
| CN | 101833729 A | 9/2010 |
| DE | 102011013760 A1 | 9/2012 |

(Continued)

OTHER PUBLICATIONS

GB Search Report dated Jan. 26, 2016 (6 pages).

(Continued)

*Primary Examiner* — Jean Paul Cass
(74) *Attorney, Agent, or Firm* — Frank A. MacKenzie; Bejin Bieneman PLC (57) ABSTRACT

A selection for a shared vehicle is received. Whether the shared vehicle is in view of a user device camera is determined. At least one of directions to the shared vehicle are provided to the user device. Data of the shared vehicle are identified.

16 Claims, 8 Drawing Sheets

(56) References Cited

U.S. PATENT DOCUMENTS

| | | | | |
|---|---|---|---|---|
| 7,598,686 | B2* | 10/2009 | Lys | H05B 33/0815 315/292 |
| 7,788,587 | B2* | 8/2010 | Michelman | G06N 3/004 715/734 |
| 7,970,722 | B1* | 6/2011 | Owen | G06N 99/005 706/46 |
| 8,112,292 | B2* | 2/2012 | Simon | G06F 19/00 705/3 |
| 8,165,658 | B2* | 4/2012 | Waynik | A61B 34/20 600/407 |
| 8,180,396 | B2 | 5/2012 | Athsani et al. | |
| 8,660,635 | B2* | 2/2014 | Simon | G06F 19/3481 600/424 |
| 8,753,195 | B2* | 6/2014 | Oakes | G07F 17/326 463/17 |
| 8,761,962 | B2 | 6/2014 | Seok | |
| 8,771,059 | B2* | 7/2014 | Oakes | G07F 17/329 273/138.1 |
| 8,799,954 | B1* | 8/2014 | Ellis | H04N 5/44543 725/46 |
| 8,860,760 | B2 | 10/2014 | Chen et al. | |
| 9,038,103 | B2* | 5/2015 | Craner | H04N 21/4826 725/37 |
| 9,159,167 | B2 | 10/2015 | Tuukkanen | G06F 3/0482 |
| 9,177,434 | B2* | 11/2015 | Oakes | G07F 17/32 |
| 9,190,074 | B1* | 11/2015 | LeBeau | G06F 3/167 |
| 9,305,371 | B2* | 4/2016 | Arcas | G06T 11/001 |
| 2004/0128012 | A1* | 7/2004 | Lin | G06F 3/011 700/100 |
| 2005/0051620 | A1* | 3/2005 | DiLuoffo | G06Q 30/06 235/382 |
| 2005/0264527 | A1* | 12/2005 | Lin | G06F 3/011 345/156 |
| 2007/0047816 | A1* | 3/2007 | Graham | G06F 17/30011 382/181 |
| 2009/0102859 | A1 | 4/2009 | Athsani et al. | |
| 2012/0075343 | A1 | 3/2012 | Chen et al. | |
| 2012/0089049 | A1* | 4/2012 | Suarez | A61B 5/11 600/558 |
| 2013/0124006 | A1* | 5/2013 | Anantha | G06Q 50/01 701/1 |
| 2013/0170710 | A1 | 7/2013 | Kuoch et al. | |
| 2013/0238167 | A1 | 9/2013 | Stanfield et al. | |
| 2013/0311158 | A1* | 11/2013 | Dasari | G01V 99/005 703/10 |
| 2014/0096217 | A1* | 4/2014 | Lehmann | H04L 63/08 726/7 |
| 2014/0222298 | A1* | 8/2014 | Gurin | G06F 17/00 701/49 |
| 2014/0240349 | A1 | 8/2014 | Tuukkanen | |
| 2014/0309862 | A1* | 10/2014 | Ricci | G01C 21/00 701/36 |
| 2015/0006148 | A1* | 1/2015 | Goldszmit | G06F 17/275 704/8 |
| 2015/0248651 | A1* | 9/2015 | Akutagawa | G06Q 10/1095 705/7.19 |
| 2015/0279389 | A1* | 10/2015 | LeBeau | G06F 3/167 704/275 |
| 2015/0304406 | A1* | 10/2015 | Penilla | G01C 21/26 709/203 |
| 2016/0008632 | A1* | 1/2016 | Wetmore | A61N 7/00 601/2 |
| 2016/0012465 | A1* | 1/2016 | Sharp | G06Q 20/18 705/14.17 |
| 2016/0034254 | A1* | 2/2016 | LeBeau | G06F 3/167 704/275 |
| 2016/0063611 | A1* | 3/2016 | Davis | G06Q 30/0639 705/26.63 |
| 2016/0105475 | A1* | 4/2016 | Goodman | G06F 3/0487 715/753 |

FOREIGN PATENT DOCUMENTS

| | | | | |
|---|---|---|---|---|
| DE | 102013016096 A1 * | 4/2015 | | G07C 5/0866 |
| FR | 2951293 A1 | 4/2011 | | |
| KR | 20120001438 | 1/2012 | | |
| KR | 20130049352 | 6/2013 | | |
| WO | 2010144490 A1 | 12/2010 | | |
| WO | WO 2010144490 A1 * | 12/2010 | | G06Q 10/02 |

OTHER PUBLICATIONS

Strange, "Audi Launches Augmented Reality Tutorial App", PCMag.com, Dec. 30, 2014, 7 pages.

Lim, "Use Augmented Reality to Find Your Vehicle With Car Finder for iPhone", Intridea.com, Dec. 30, 2014, 3 pages.

* cited by examiner

SHARED VEHICLE SYSTEM

RELATED APPLICATIONS

This application claims priority to U.S. Provisional Application Ser. No. 62/038,390, filed Aug. 18, 2014, and U.S. Provisional Application Ser. No. 62/038,392, filed Aug. 18, 2014, each of which are hereby incorporated herein by reference in their respective entireties.

BACKGROUND

Peer-to-peer vehicle sharing offers a good mix of flexibility, cost, ease of use, and environmental impact as a form of transportation. Current peer-to-peer vehicle sharing systems have difficulty accounting for a user's preferred settings among several shared vehicles. Users may also have difficulty locating a selected shared vehicle.

DESCRIPTION

Personal vehicles generally provide a flexible form of transportation for commuters and passengers within urban environments. However, owning and operating a personal vehicle can be expensive when costs for the vehicle, fuel, insurance, and maintenance are factored in. In addition, personal vehicles increase congestion and pollution in urban environments. Public transit systems, including buses, trains, subways, etc., that operate on a fixed schedule, are a lower-cost option for commuters that also can reduce in-city congestion and improve air quality. However, a commuter may have limited flexibility in terms of departure and arrival times, as well as departure and arrival locations.

A shared transportation option that provides a good mix of flexibility, cost, ease of use, and environmental impact is a shared vehicle system. Therein, a fleet of vehicles are distributed over an operating zone (e.g., a city), and a user can rent any vehicle of the fleet for a short period (e.g., a few hours of a day). The fleet of vehicles may be owned and operated by a single company. Alternatively, each vehicle in the fleet may be privately owned by an individual, and peer-to-peer (P2P) vehicle sharing is enabled wherein a vehicle owner rents out their vehicle during times when he or she is not using the vehicle. Once a user account is set up, the user can identify a vehicle he or she wishes to rent based on a vehicle location within an operating zone, and the user can then rent the vehicle without additional paperwork being required. The user can then return the vehicle to the point of origin or drop off the vehicle at an alternate location, according to the user's convenience. The shared vehicle system reduces the user's commuting cost while also reducing in-city congestion and pollution. At the same time, the ability to pick-up and drop-off a vehicle at a time and location determined by the user increases the user's flexibility.

Unfortunately, while some shared vehicle systems provide vehicles of the same make, model, and color, in peer-to-peer vehicle sharing systems, there is high variability in vehicle availability (including make, model, trim level, color, etc.). As a result, a user may have to rent a vehicle of substantially varying type, make, and/or model at each rental. Due to significant differences between features available on vehicles of different makes, models, and trim levels, as well differences between a rented vehicle and a user's personal vehicle (or a frequently rented vehicle), even within a given vehicle category (e.g., sedan), the user may have to relearn the location and operation of features, buttons, ignition types, commands, spare tire, jack and tool kit, etc., before the user can drive the rented vehicle with ease. In addition, locating the vehicle in a large parking space may become complicated as the user may have to remember which vehicle he or she rented each time. All of these may degrade a user's drive experience and even deter a user from frequently using a shared vehicle system.

Furthermore, other difficulties may arise concerning use of peer-to-peer shared vehicle systems. A primary user of a vehicle may have preferred settings selected when the primary user uses the vehicle. These preferred settings may be visible to alternate users when the vehicle is rented to such alternate users. The primary user may not wish for the preferred settings to be viewed or tampered with by others. Nonetheless, secondary users may adjust those settings so as to improve their drive experience when renting the given vehicle. On the other end, a user frequently renting vehicles may be inconvenienced by the need to shift and adjust settings to preferred settings each time the user rents a vehicle.

Augmented reality applications may be provided with respect to peer-to-peer vehicle rental systems. In this example, an augmented reality based application may be used on a personal device of a user (e.g., a smartphone or the like) to allow a user to easily identify a rental vehicle for a particular rental by scanning a parking area. In addition, the augmented reality based application may enable salient features of the rented vehicle that are different (e.g., in operation and/or location) from those of the vehicle commonly operated by the user (e.g., the user's personal vehicle, most frequently rented vehicle and/or most recently rented vehicle) to be pointed out to the user. This allows a user to more easily locate a rental vehicle. Furthermore, the user is able to more rapidly familiarize himself or herself with features of the rental vehicle, thereby improving the user's overall vehicle experience.

As an example, a user may rent a vehicle of a peer-to-peer shared vehicle system via an application running on a user device such as a smartphone. The user may send, e.g., via a network that is wireless, cellular, etc., a request to a central server, e.g., a computing device including a processor and a memory, the memory storing instructions executable by the processor. The central server may keep track of fleet availability, and the server may match the user to a vehicle based on various criteria. The server may also provide an indicator, or "tag," to be associated with the vehicle in a display that allows a location of the vehicle to be mapped by a user device. The user device application may further have an augmented reality location indicator feature. The augmented reality location indicator may be enabled when the user operates a camera on a device such as a smartphone while running the application.

In another example, when an augmented reality location indicator feature is selected, a camera of the personal device may be automatically activated. The user may then use the camera to scan a parking area and/or vicinity. The application running on the personal device may be communicatively coupled to the central server of the shared vehicle rental system and may therefore have details about the vehicle being rented by the user. Therefore, when the user scans the parking space and a tagged rental vehicle appears within the range or display of the smartphone, the application may indicate the location of the tagged vehicle to the driver via a highlighted augmented reality based display.

For example, the make and model of a vehicle may be prominently displayed (e.g., zoomed in) on the display, and step-by-step instructions on how to arrive at the rental vehicle may also be displayed. As an example, while scanning an area, the display may indicate that the user's requested sedan is the white Ford Fusion located adjacent to a blue SUV, the rented vehicle located two rows away from the user. The application may overlay driving directions to the vehicle on top of the view of the scanned area so that the user can be easily guided to the correct vehicle. In addition, the rental vehicle may be made to respond to help the user to locate the vehicle, for example, by beeping a horn of the vehicle, flashing lights of the vehicle, etc., until the user is within a threshold distance of the vehicle. In this way, the user may locate the vehicle more easily. Advantageously, the user may be relieved of memorizing exact details (e.g., make, model, color, license plate number, etc.) of the rental vehicle, making vehicle renting simpler.

In some examples, attributes of the augmented reality indicator displayed on the application running on the user's smartphone may vary based on a distance of the user from the rental vehicle. For example, when the user is further away from the vehicle, the augmented reality indicator may display a zoomed view of the vehicle when the camera scans in the direction of the vehicle. Then, as the user approaches the vehicle, the augmented reality indicator may display a map overlaying the view of the user's vicinity with directions to the vehicle prominently marked (e.g., highlighted in a different color). Likewise, the vehicle may be made to start beeping only when the user is approaching the vehicle to help the user hone in on the correct car. In some examples, an embedded modem may also be leveraged to open the vehicle door.

The augmented reality based application may also appraise the user of salient features in the vehicle once the user is in the vehicle. For example, when the user scans the center console of the vehicle, the display may alert the user as to the specific location, function, and operation of buttons on the center console of the given rental vehicle. Likewise, when the user scans the exterior of the vehicle, the display may alert the user as to the specific location, function, and operation of features on the outside of the vehicle (e.g., location of tank refill door, location of spare tire, location of wipers, etc.). The displayed selection may include features frequently used by a user (e.g., cruise control, Bluetooth, etc.) as stored in the user's profile, features that are different on the given vehicle as compared to vehicles usually rented by the user, and/or preferred settings as selected by the user in the user's profile settings.

The augmented reality feature of the application may also be used to diagnose issues with vehicle operation and address maintenance issues. For example, if a malfunction indication light appears on the vehicle's display and the user is not sure as to what is the needed mitigating action, the user may hold the personal device up with the augmented reality indicator running on the application and scan the vehicle display. The application may then overlay the view of malfunction indication light with instructions on steps the user needs to perform. The steps may include arrows and other markers indicating the precise location of buttons or features that the user needs to actuate, in relation to their location to the displayed malfunction indication light, so that the user can address the issue. As another example, if a user has a flat tire, the user may scan the flat tire using the personal device and the augmented reality indicator may recognize, via the scanned image, that the user needs assistance to flat tire repair. The augmented reality indicator may then provide detailed explanations of where to locate the spare tire, the car jack, and other tools, and how to perform the flat tire repair. For example, the correct positioning of the car jack may be overlaid on the picture of the vehicle flat tire so that the user is appraised as to where exactly the jack needs to be positioned.

As discussed above, the attributes of the augmented reality indicator displayed on the application running on the user's smartphone may vary based on the distance of the user from the feature that the user wants assistance with. For example, when the user is further away from a center console display, the augmented reality indicator may display arrows and labels clarifying what each feature visible in the display is. Then, as the user zooms in on a given feature, the augmented reality indicator may display the detailed functionality of the feature including how the feature is operated. In some examples, the details displayed via the augmented reality indicator may include details imported from the vehicle's manual, the manual of the given vehicle stored online in the database of the central server.

In still another example, a user may remotely view the state of a rental vehicle via the application. For example, at a time of vehicle pick-up, the user's smartphone may be used to scan the vehicle. Via communication with the central server, data pertaining the scanned vehicle may be automatically downloaded and relevant data may be displayed to the user via augmented reality. For example, details regarding the fuel level of the vehicle's fuel tank, tire pressure, fluid levels, coolant level, cabin temperature, etc., may be displayed to the user on a device such as a smartphone. The data may be overlaid on the captured image of the vehicle.

Further still, the data may be overlaid on the relevant region of a display of the vehicle. For example, a fuel level of the fuel tank may be displayed overlying the fuel tank region of the vehicle, with an additional arrow indicating the location of the fuel tank refilling door. As another example, a pressure of each tire may be displayed overlying the image of the corresponding tire. In addition, if any tire needs to be replenished with air, the corresponding tire may be highlighted in a display of the vehicle, and the user may be alerted. As another example, a coolant level may be indicated over the vehicle's hood. If the coolant level is low, arrows and other visual cues may be provided to the user to explain to them where and how coolant needs to be refilled, as well as the brand of coolant to be used for the given vehicle. The display may also provide the user with the name of local shops where one can purchase the coolant as well as the price of the coolant at those locations.

In still further examples, the display may indicate a current cabin temperature to the user and enable the user to remotely change the state of the vehicle before entering the cabin. For example, cabin air conditioning or heating may be remotely enabled, and/or a fan may be activated, so that the vehicle cabin is adjusted to the user's preferred temperature setting by the time they enter the vehicle. In this way, vehicle comfort is improved.

In some examples, a user may also personalize the augmented reality application look-and-feel by indicating user preferences in the user profile stored on the central server. This may include, for example, fonts, font sizes, colors used for highlighting areas, etc., used in the augmented reality display. Further, the preferences may include settings for the degree of detail to be provided via the augmented reality indicator (e.g., whether to mark via arrows the location of buttons or to include step-by-step instructions on how to operate each button), whether to import details from the vehicle's manual or to provide a more user friendly and concise description, etc.

In this way, augmented reality can be used to allow a vehicle to quickly familiarize themselves with features and attributes of a rented vehicle. In addition, the user can easily troubleshoot issues arising during vehicle operation. Further still, a user can easily locate a vehicle without having to memorize the details of the rental vehicle. An experience with shared vehicle systems, particularly peer-to-peer shared vehicle systems is improved.

In another example, driver-specific settings may be learned for each vehicle (or vehicle type) used by a user, and saved in a user's profile. During each new vehicle rental, a user's driver-specific settings may be retrieved (automatically, or upon request) and used to adjust the vehicle's settings. In addition, the settings of a primary user may be hidden so that a secondary user such as a renter is neither able to see the primary user's settings, nor tamper with them. In this way, each vehicle can be customized to each driver without incurring any overlap or interference between users. In addition, the privacy of each user is maintained.

As an example, a driver "portrait" is generated for each driver and stored in a central server of the vehicle rental system under the user's profile. For example, settings for a driver portrait may be stored in the cloud, e.g., on a remote computer server such as a database server. The driver portrait typically includes driver-specific settings such as favorite in-vehicle settings for a seat, window, steering wheel, mirror, infotainment system (e.g., source of music, radio stations, music genre, etc.), and/or other vehicle elements. Other settings learned as part of the driver portrait may include favorite destinations, favorite routes, recent destinations, favorite gas stations, etc.

The settings may be learned for each driver in the context of a vehicle or type of vehicle being used. For example, the settings may be learned in the context of whether the user was driving the user's primary vehicle (wherein the user is the primary user of the vehicle) or whether the user was driving a rental vehicle (wherein the user is the secondary user of the vehicle). Further still, the settings may be learned as a function of the vehicle type, make, and model. For example, the driver may have a first portrait including a first group of settings that the user likes to use when driving a sporty vehicle and a second, different portrait including a second group of settings that the user likes to use when driving a family-friendly vehicle, such as a minivan.

The settings for a driver portrait may also be learned in a location-specific context. For example, settings may be learned as a function of a state or country the vehicle is being driven through. As an example, when driving in USA, the driver may prefer to have the speedometer display speed in miles per hour but the same driver may prefer to have the speedometer display speed in kilometers per hour when driving in Canada. As another example, the driver may allow cruise control to drive within 5 mph of the speed limit when driving in Oregon but may prefer cruise control to driver at the speed limit (with no deviation) when driving in Washington or California.

The learned settings of a primary user/driver may be automatically hidden when the vehicle is rented and operated by a secondary user. For example, driver infotainment settings preset by the primary user may hidden when the primary user is not detected in the vehicle, such as when the user's personal device or smartphone or smart key is not detected in the vehicle. In one example, when the primary user is not in the vehicle, the settings may shift to a "valet mode" where the primary driver's settings are hidden, thereby maintaining their privacy. Instead, default settings (e.g., manufacturer default settings) may be displayed when the secondary user enters the vehicle. In addition, the driver profile of the secondary user may be automatically retrieved via an application running on the secondary user's personal device (or on an application running on the vehicle's control system), and used to adjust the vehicle settings to match the driver portrait of the secondary user. Alternatively, a driver profile match may be made and the user may be queried if he or she wishes to import driver-specific settings into the rented vehicle. Upon prompting, the vehicle settings may be accordingly adjusted. In this way, the new user's settings are incorporated to improve their driver experience without disturbing or tampering with the settings of the previous user. If the driver portrait is not available for the new (temporary) user, the settings of the new user may be learned and saved in their user profile on the cloud.

In some examples, the vehicle control system may also display setting recommendations for the new user. The setting recommendations may be displayed on a center console display of the vehicle, or on a display of a smartphone of the user running a driver portrait application. The recommendations may be based on the user's drive history. For example, recommendations pertaining to infotainment settings, seat settings, mirror settings, vehicle HVAC settings, etc. may be provided to the user. Based on selections made by the user, the user's driver portrait and user profile may be updated.

In this way, a vehicle owner can rent a vehicle in a peer-to-peer shared vehicle system without worrying about privacy and security issues related to settings on the vehicle. At the same time, a temporary user can rent the vehicle and have his or her settings incorporated into the vehicle for the duration of use of the vehicle, thereby improving a drive experience.

Figure 1:
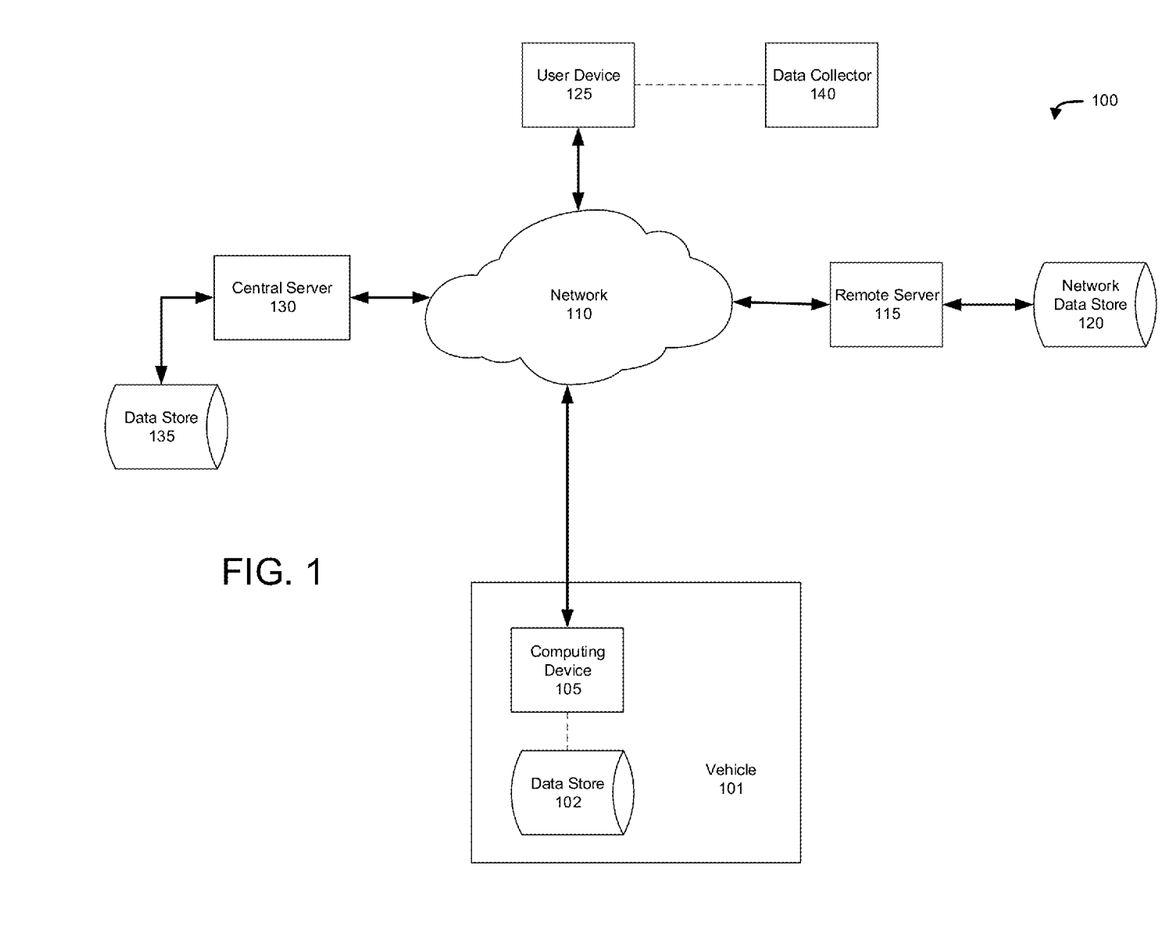
FIG. 1 is a block diagram of a shared vehicle system.

FIG. 1 illustrates a system 100 for shared vehicle rental. The system 100 includes a vehicle 101, e.g. a shared vehicle, including a computing device 105 and a data store 102, e.g., one or more memories or media included in or communicatively coupled to the computing device 105. The memory includes one or more forms of computer-readable media, e.g., volatile and/or non-volatile storage as are known, the memory storing instructions executable by the processor for performing various operations, including as disclosed herein. Further, the computing device 105 may include more than one computing device, e.g., controllers or the like included in the vehicle 101 for monitoring and/or controlling various vehicle components, e.g., an engine control unit (ECU), transmission control unit (TCU), etc. The computing device 105 is generally configured for communications on an in-vehicle network and/or communications bus such as a controller area network (CAN) bus or the like. The computing device 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors. Alternatively or additionally, in cases where the computer 105 actually comprises multiple devices, the CAN bus or the like may be used for communications between devices represented as the computing device 105 in this disclosure.

The computing device 105 is connected to a network 110. The network 110 connects to a network server 115 and a network data store 120, e.g., a hard disk drive, a solid-state drive, or any other volatile or non-volatile medium. The network 110 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The system 100 includes a central server 130 having a data store 135. The system 100 further includes a user device 125, e.g. a cellular telephone, a tablet, or other commonly carried devices, the user device 125 having a data collector 140. The data collector 140 collects identifying data, an image. The data collector 140 may be any device suitable to collect identifying data, e.g. a camera. The data collector 140 is configured to send data to the computing device 105 and the central server 130, e.g., each of the computing device 105, the data collector 140, and the data store 115 may be communicatively coupled to the network 110.

Figure 2:
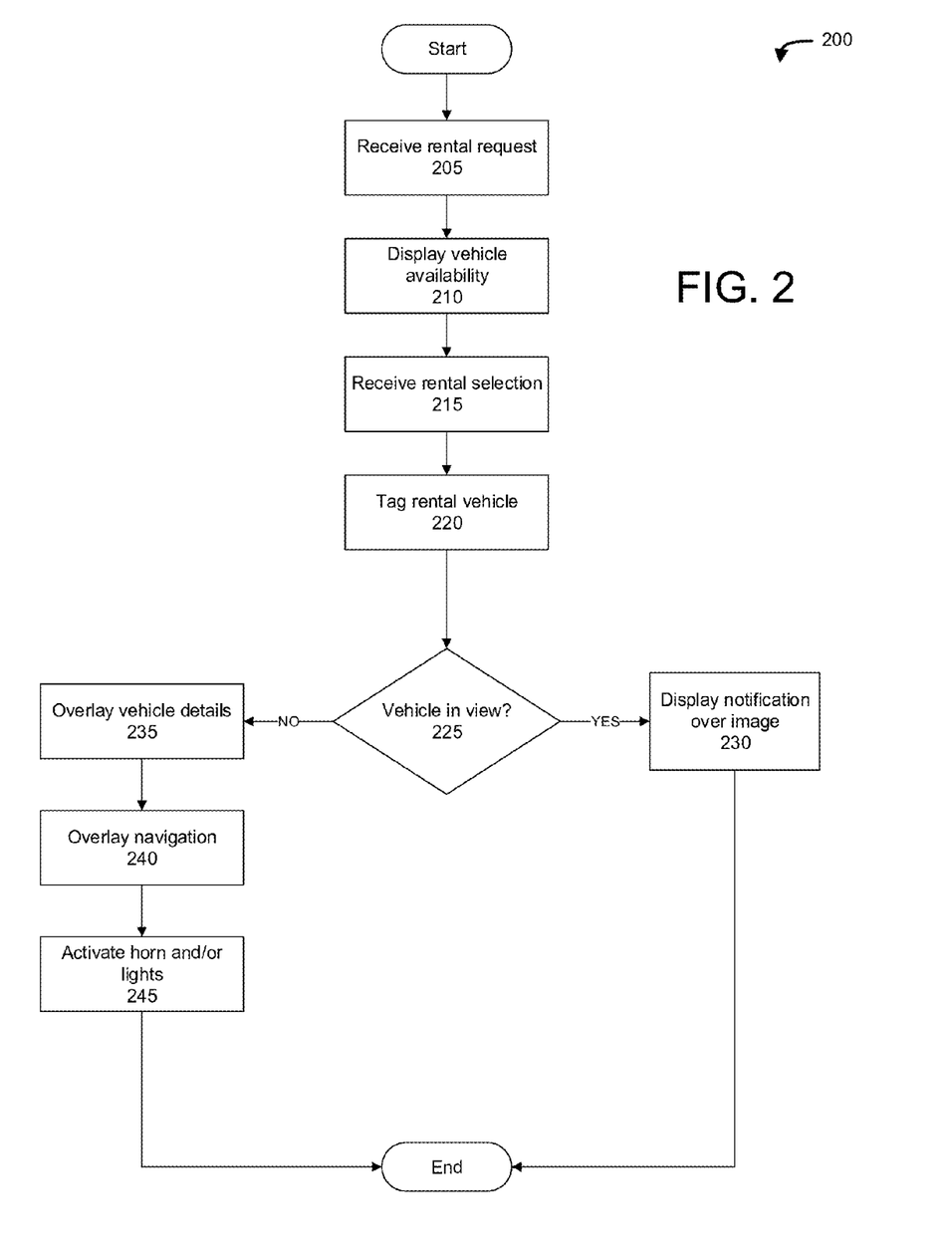
FIG. 2 is a block diagram for a method of locating a shared vehicle.

FIG. 2 illustrates an example process 200 for identifying the shared vehicle 101 for rental. The process 200 starts in a block 205, where the central server 130 receives a request for the shared vehicle 101. A user may send the request in any suitable manner over the network 110, e.g., through a dedicated application on the user device 125, through an electronic message from a separate computing device, or through any other suitable communication mechanism.

Next, in a block 210, the central server 130 provides availability for the shared vehicle 101 based, at least in part, on the user's preferred vehicles, to the user device 125, which may then display this information. The availability may be based on proximity to the user, preferred features, and/or required load capacity for the present usage.

Next, in a block 215, the central server 130 receives the user's selection for the shared vehicle 101.

Next, in a block 220, the central server 130 provides an indicator, or tag, for the shared vehicle 101. A tag may be a flag in a central server 130 database that is associated with an identifier for the shared vehicle 101, and indicates that the shared vehicle 101 is in use. The central server 130 indicates that the shared vehicle 101 is reserved for the current user and removes it from the rental selection of other users. The tag may be removed once the current user is finished with the shared vehicle 101.

Next, in a block 225, the central server 130 uses a data collector 140 on the user device 125, e.g., a camera, to determine whether the shared vehicle 101 is in view of the device 125.

If the shared vehicle 101 is in view of the user device 125, the process 200 moves to a block 230. In the block 230, the central server 130 send a notification to overlay on the image on the user device 125 identifying the shared vehicle 101 and the process 200 ends.

If the shared vehicle 101 is not in view of the user device 125, the process 200 moves to a block 235. In the block 235, the central server 130 overlays details of the shared vehicle 101 on the user device 125. For example, as shown in FIG. 5, the details may include the make, model, color, and identifying feature (e.g. a license plate) of the shared vehicle 101.

Figure 5:
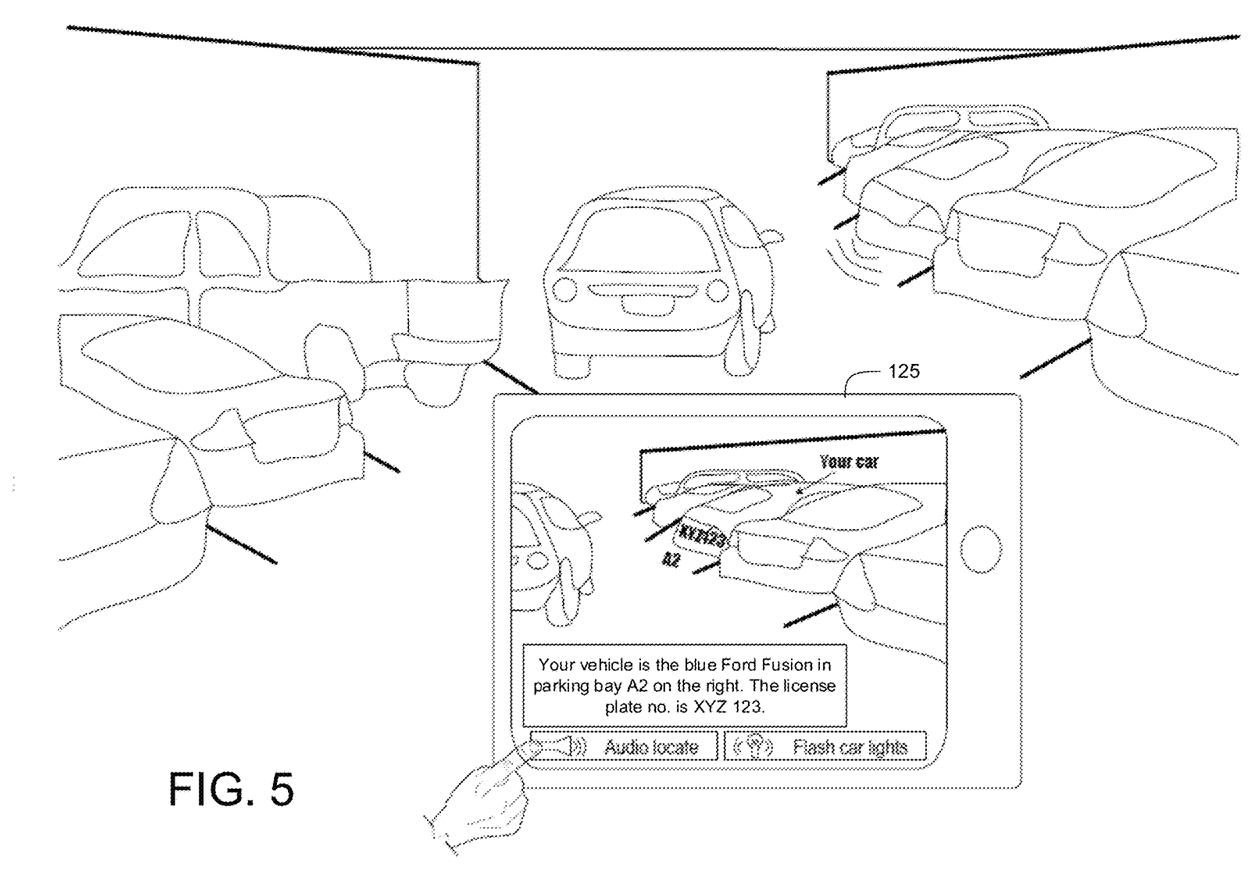
FIG. 5 is an exemplary view of a user device displaying navigation to the shared vehicle.
Figure 6:
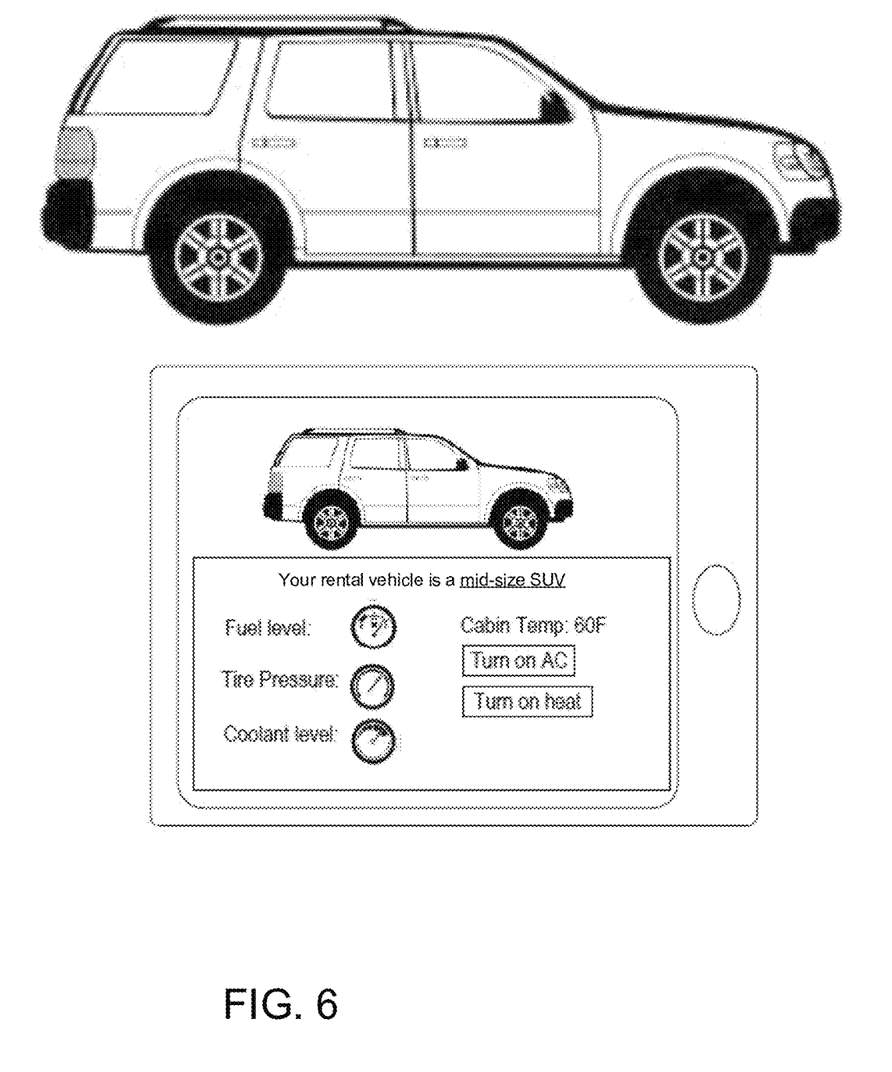
FIG. 6 is an exemplary view of vehicle information displayed on a user device.

Next, in a block 240, the central server 130 displays directions to the shared vehicle 101 on the user device 125, e.g., as illustrated in FIG. 5. The directions may be a series of words or images, e.g., an arrow, displayed on the user device 125 to direct the current user to the shared vehicle 101. While the user approaches the shared vehicle 101, the user may activate certain features of the shared vehicle 101, e.g., as illustrated in FIG. 6. For example, the user may activate a climate control system to a preferred setting.

Next, in a block 245, the central server 130 activates at least one of the horn and the lights of the shared vehicle 101, and then the process 200 ends. The horn and the lights may be activated automatically, or the central server 130 may prompt the current user to activate the horn and the lights with a notification on the user device 125.

Figure 3:
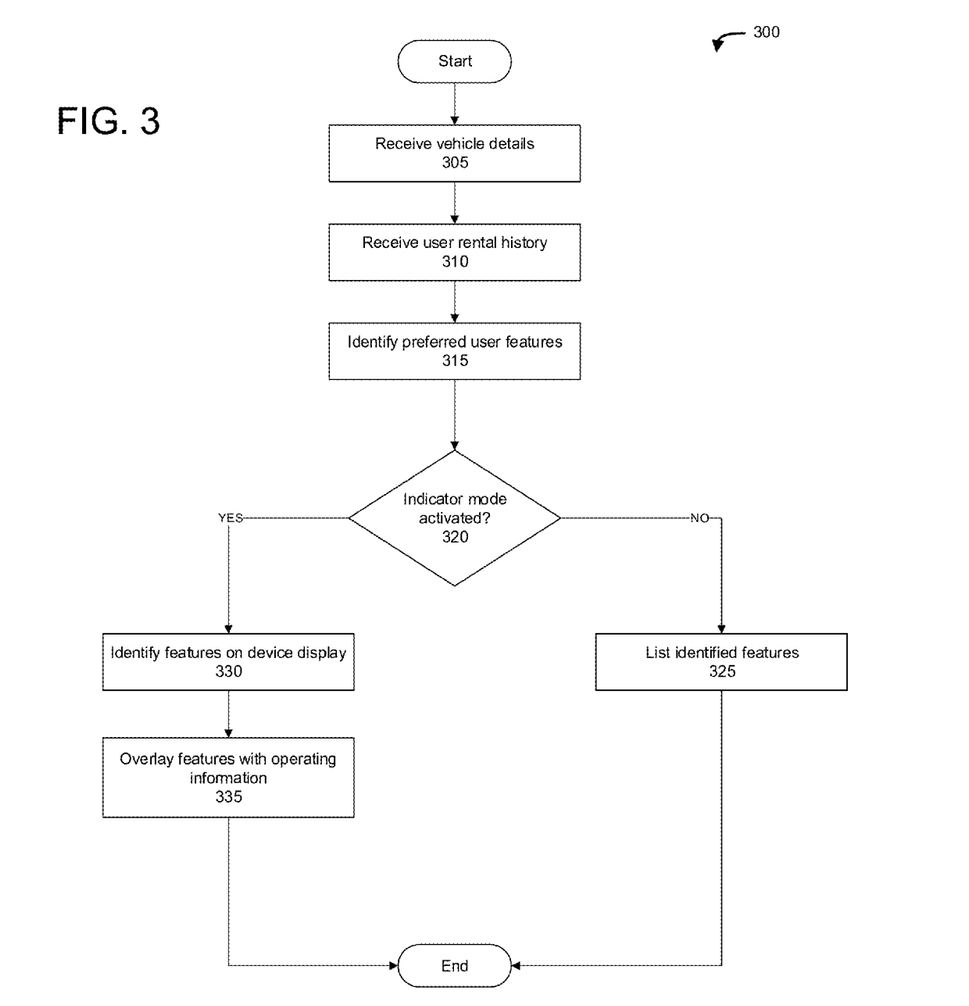
FIG. 3 is a block diagram for a method of displaying preferred features in the shared vehicle.

FIG. 3 shows an example process 300 for identifying preferred user features in the shared vehicle 101. The process 300 starts in a block 305 where the central server 130 receives details of the shared vehicle 101.

Next, in a block 310, the central server 130 receives a user rental history from the user profile stored at the server 130. The user rental history may include vehicles rented by the current user in the past, preferred user features in the vehicles, and common features that the vehicles shared.

Next, in a block 315, the central server 130 identifies preferred user features from the user rental history that are present in the shared vehicle 101.

Next, in a block 320, the central server 130 determines whether the user has activated an indicator mode. The indicator mode provides information to the user about the components of the shared vehicle 101 and how to use the components. For example, the shared vehicle may include a media system, e.g. a radio, that is unfamiliar to the user. The indicator mode could provide instructions on how to use the media system. The indicator mode may be a preset setting in the user profile, or it may be a prompt that the user selects at the time of rental.

If the indicator mode is not activated, the process moves to a block 325, where the central server 130 lists the preferred user features present in the shared vehicle 101 on the user device 125, and the process 300 ends.

Figure 8:
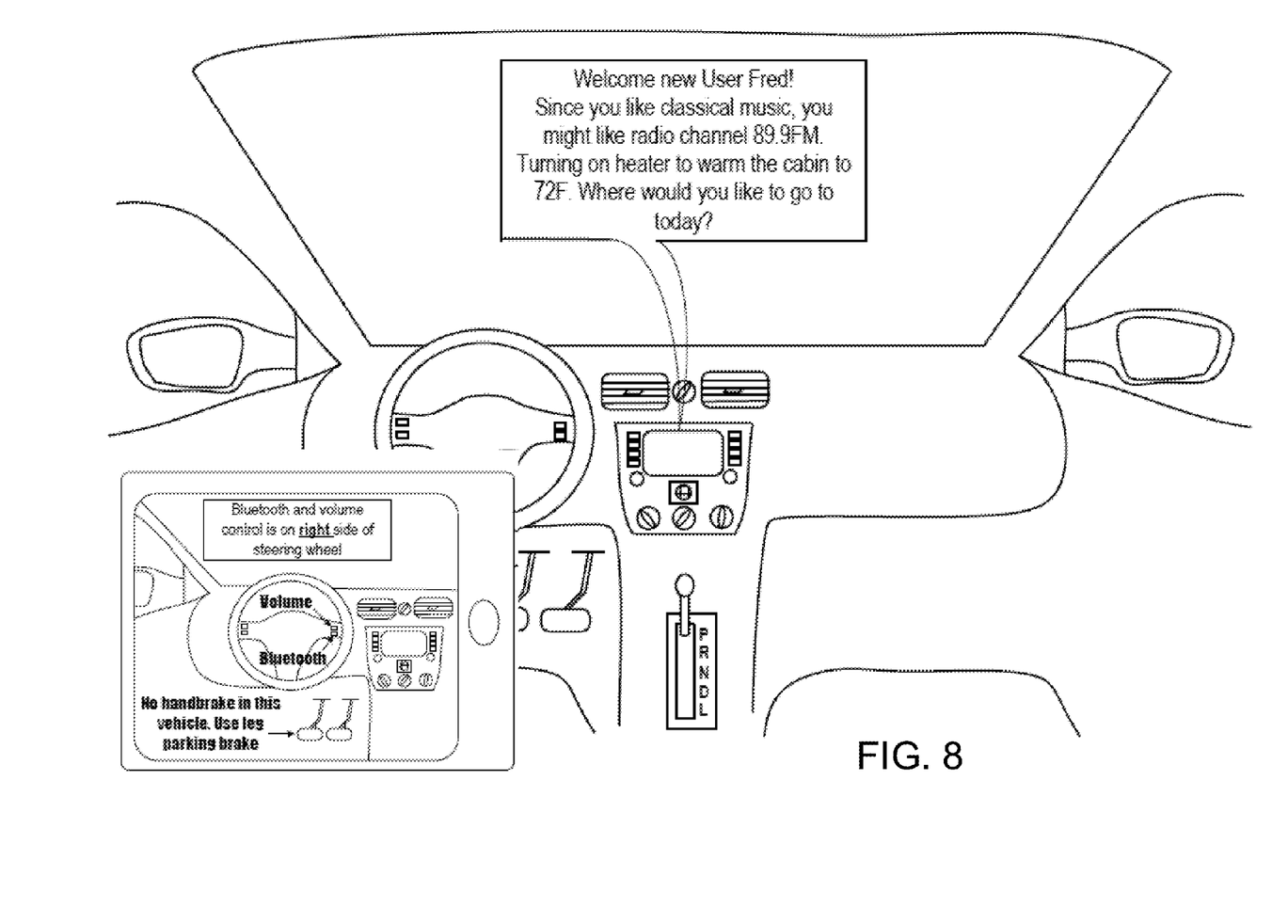
FIG. 8 is an exemplary view of the shared vehicle with a set of temporary user settings enabled.

If the indicator mode is activated, the process moves to a block 330, where the central server 130 provides the preferred user features to the user device 125, which may then display them. For example, as the camera of the user device 125 shows one of the preferred user features, the feature is highlighted on the screen of the user device 125, e.g., as illustrated in FIG. 8.

Next, in a block 335, the central server 130 provides operating information for the feature to the user device 125 for display, e.g., overlaid on an image of the vehicle 101, and then the process 300 ends.

Figure 4:
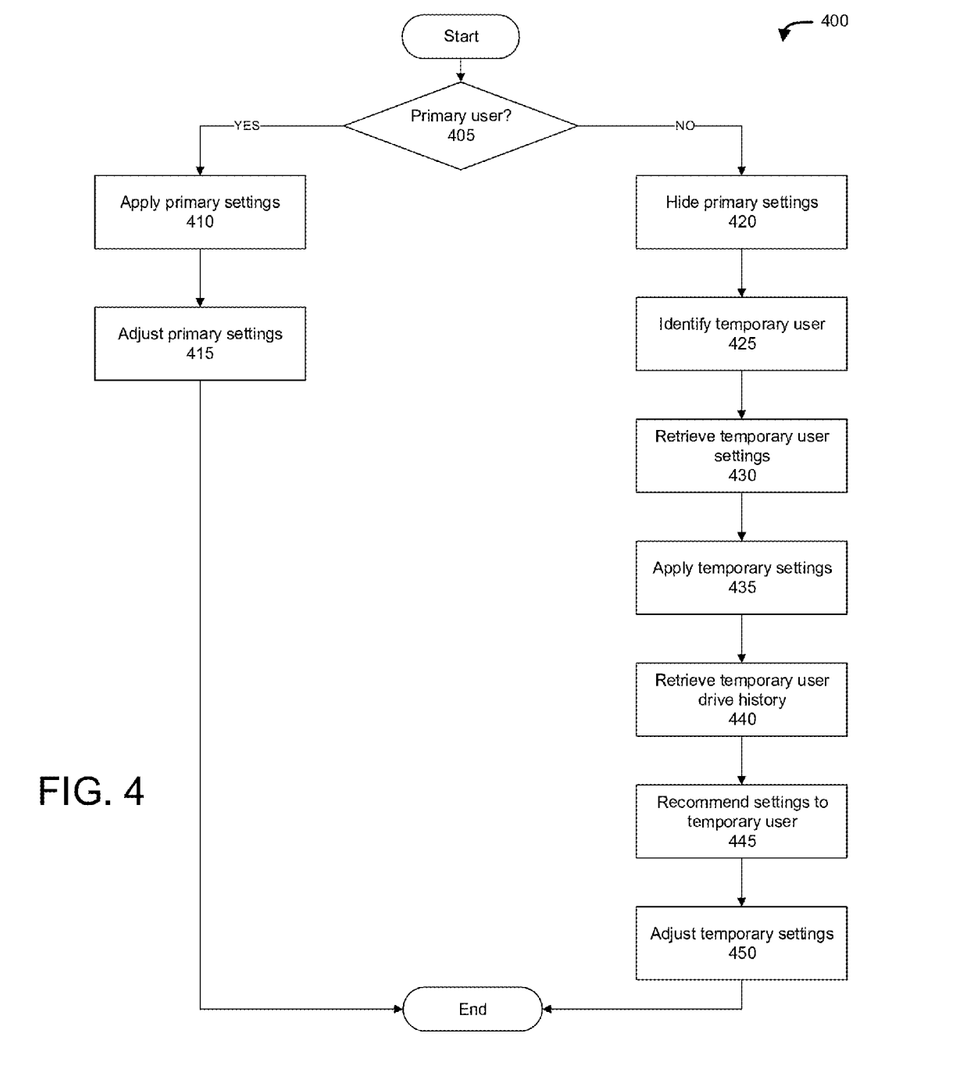
FIG. 4 is a block diagram for a method of hiding a set of primary user settings when a temporary user uses the shared vehicle.

FIG. 4 illustrates an example process 400 for activating settings in the shared vehicle 101 based on the current user. The process begins in a block 405, where the central server 130 determines whether the current user is the primary user of the shared vehicle 101.

Figure 7:
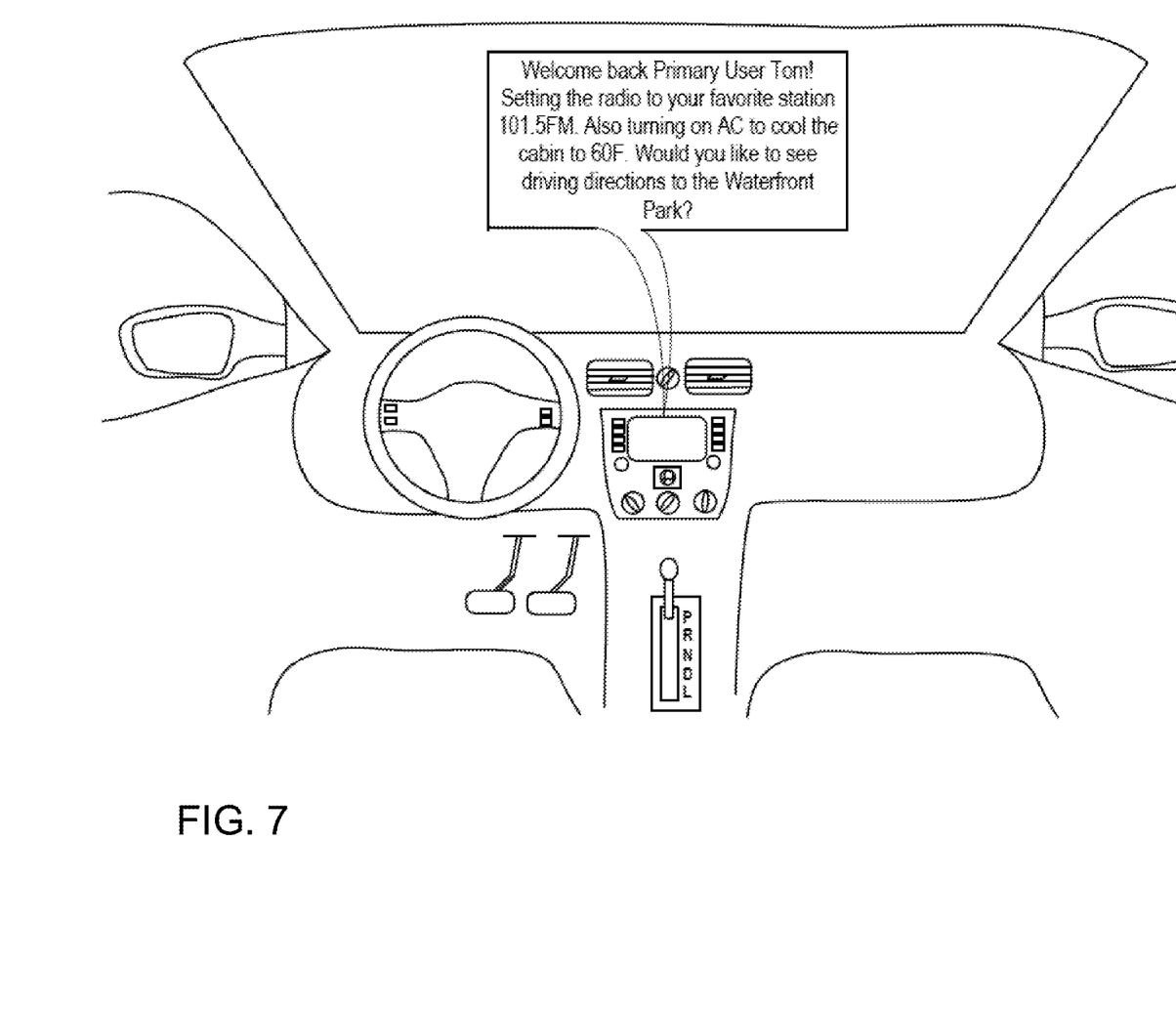
FIG. 7 is an exemplary view of the shared vehicle with the set of primary user settings enabled.

If the current user is the primary user, then the process 400 moves to a block 410. In the block 410, the central server 130 activates the components of the shared vehicle 101 to the primary settings for the shared vehicle 101, e.g., as shown in FIG. 7.

Next, in a block 415, the central server 130 updates the primary settings based on operation of the shared vehicle 101, and the process 400 ends.

If the current user is not the primary user, the process 400 moves to a block 420. In a block 420, the central server 130 resets the components to a default setting and prevents the user from applying the primary settings. That is, the user profile for the primary user profile may not be accessed.

Next, in a block 425, the central server 130 identifies the current user. Specifically, the central server 130 identifies current user based on an identity of a user who has rented the vehicle 101.

Next, in a block 430, the central server 130 retrieves the user settings for the current user available for the shared vehicle 101.

Next, in a block 435, the central server 130 activates the components of the shared vehicle 101 to the user settings, e.g., as shown in FIG. 8. For example, if the current user has saved a specific radio station, the central server 130 may activate the media system to the specific radio station.

Next, in a block 440, the central server 130 retrieves the current user's drive history. The drive history may include information about a user's past use of the vehicle 101 and/or other vehicles in the system 101, e.g., an average operating speed, preferred radio stations, climate control settings, etc.

Next, in a block 445, the central server 130 recommends user settings for the shared vehicle 101 to the current user based on the current user's drive history. For example, if the current user selects a radio station that is not stored in the current user's settings, the central server 130 may recommend storing the radio station for future use. The recommendation may be a notification on the user device 125 and/or an audiovisual message played over the speakers of the shared vehicle 101.

Next, in a block 450, the central server 130 adjusts, i.e., changes, the current user settings based on the current user's operation of the shared vehicle 101. For example, the current user setting may include a preferred cabin temperature. If the current user changes the cabin temperature from the preferred cabin temperature, the central server 130 may change the saved cabin temperature to match the current cabin temperature. The central server 130 stores the adjustments in the data store 135, updating the current user's settings, and the process 400 ends.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the components, processes, systems, methods, etc. described herein, it should be understood that these are provided for the purpose of illustrating certain embodiments, and should in no way be construed so as to limit the claimed invention.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the computer to:
   receive a selection of a shared vehicle;
   determine whether the shared vehicle is in view of a user device camera;

provide to the user device directions to the shared vehicle;
overlay identifying data of the shared vehicle on a display of the user device;
receive specified user settings; and
display the specified user settings and locations of physical vehicle components associated with respective user settings in the shared vehicle on the display of the user device to direct a user to the locations of the physical vehicle components associated with the user settings in the shared vehicle.

2. The system of claim 1, wherein the instructions include instructions to adjust saved preferred user settings based at least in part on the operation of the shared vehicle.

3. The system of claim 1, wherein the instructions further include instructions to recommend modifications to the preferred user features.

4. The system of claim 1, wherein the instructions further include instructions to obtain a user rental history and suggest the selection of the shared vehicle based at least in part on the user rental history.

5. The system of claim 1, wherein the instructions further include instructions to identify whether the user is a primary user of the shared vehicle.

6. The system of claim 5, wherein the instructions further include instructions to set the components of the shared vehicle to a default state if the user is not the primary user of the shared vehicle.

7. The system of claim 1, wherein the instructions further include instructions to activate the components of the shared vehicle prior to entering the vehicle.

8. The system of claim 7, wherein the components include a climate control system.

9. The system of claim 1, wherein the instructions further include instructions to play a prerecorded message personalized to the user.

10. The system of claim 1, wherein the instructions further include instructions to activate a horn of the shared vehicle.

11. A method, comprising:
receiving a selection of a shared vehicle;
determining whether the shared vehicle is in view of a camera on a user device;
providing directions to the shared vehicle to the user device;
overlaying identifying data of the shared vehicle on a display of the user device;
receiving specified user settings; and
displaying the specified user settings and locations of physical vehicle components associated with respective user settings in the shared vehicle on the display of the user device to direct a user to the locations of the physical vehicle components associated with the user settings in the shared vehicle.

12. The method of claim 11, wherein the saved preferred user settings are adjusted based at least in part on the operation of the shared vehicle.

13. The method of claim 11, further comprising identifying whether the user is a primary user of the shared vehicle.

14. The method of claim 13, further comprising if the user is not the primary user of the shared vehicle, setting the components of the shared vehicle to a default state.

15. The method of claim 11, further comprising activating the components of the shared vehicle prior to entering the shared vehicle.

16. The method of claim 11, further comprising playing a prerecorded message personalized to the user upon entering the shared vehicle.

* * * * *

UNITED STATES PATENT AND TRADEMARK OFFICE
CERTIFICATE OF CORRECTION

PATENT NO. : 10,106,172 B2
APPLICATION NO. : 14/800533
DATED : October 23, 2018
INVENTOR(S) : Eric H. Wingfield et al.

Page 1 of 1

It is certified that error appears in the above-identified patent and that said Letters Patent is hereby corrected as shown below:

In the Claims

Column 11, Line 5 - Replace "physical vehicle components" with --vehicle components--;
Column 11, Line 8 - Replace "physical vehicle components" with --vehicle components--;
Column 12, Line 13 - Replace "physical vehicle components" with --vehicle components--; and
Column 12, Line 16 - Replace "physical vehicle components" with --vehicle components--.

Signed and Sealed this
Third Day of November, 2020

Andrei Iancu
*Director of the United States Patent and Trademark Office*